Patented May 26, 1931

1,807,244

UNITED STATES PATENT OFFICE

RALPH W. LANE, OF CANTON, MASSACHUSETTS, ASSIGNOR TO THE HAINES CORPORATION, OF BOSTON, MASSACHUSETTS, A CORPORATION OF MASSACHUSETTS

ADHESIVE COMPOSITION

No Drawing. Application filed July 8, 1929. Serial No. 376,863.

This invention relates to an adhesive composition and more particularly to such a composition for use in connection with textile materials. One of the applications which is contemplated for my invention is its use for applying silk or cotton or other textile labels. Such labels are used under a great variety of conditions of temperature, moisture and heat.

It has heretofore been impossible to obtain a thoroughly satisfactory adhesive backing which will have a long life under any or all of these conditions, and which is capable of withstanding a complete change, in these conditions, such as from a moist to a dry atmosphere. Other adhesive compositions have been unsatisfactory because they tend to dry, or become too soft, or fail to stick hard enough to the surface to which they have been applied and are limited to a comparatively short life of a few months.

It is an object of this invention to provide a composition which will be waterproof, and capable of withstanding changes in the conditions surrounding its use and which will maintain its adhesive qualities over a long period of time.

I attain these objects by a novel composition of which latex and rubber, soft copal, rosin and gutta-percha or any gum together with a filler, constitute the preferred principal ingredients. A workable composition may be obtained even though the proportions of the ingredients are greatly changed or equivalent substances substituted therefor, and even if one or more are entirely omitted. For example a workable composition will be obtained if latex alone is used, without any rubber, although in the preferred form of my invention I employ a large proportion of sheet rubber and of a tacky rubber in addition to latex.

In forming my composition I first reduce the solid ingredients, by passing them between the rolls of a masticator. The resulting doughy material is cut into strips and dissolved by means of any solvent suitable for that purpose. After this mixture has been churned for some time I add the latex and continue churning the mixture for a time thereafter. The composition thus obtained may be kept indefinitely without separating. In case it hardens after standing it may readily be brought back to a proper condition for application by adding a small proportion of solvent.

In the preferred form of my invention I have found it desirable as stated above to use a proportion of a rubber having an especially tacky character in addition to the ordinary rubber employed. Any reclaimed rubber is suitable for this use. While the proportions of ordinary rubber, latex, and a tacky rubber may be varied greatly I prefer to use them in about the following proportions:

Latex_____ from about 5 to 15%
Ordinary rubber____ from about 17 to 40%
Tacky rubber_____ from about 3 to 12%

In place of copal, a workable composition may be obtained by substituting another resin but I prefer to use a soft copal such for example as that known as Manilla copal. Any gum may be used but I prefer to use gutta-percha or any of its allied gums. In addition it may be desirable to use a small amount of rosin, such as Burgundy pitch. I prefer to use these ingredients in the following proportions:

Copal_____ from about 3 to 10%
Gutta-percha_____ from about 6 to 25%
Burgundy pitch_____ from about 1½ to 5%

Any mineral filler may be used, any oxide, preferably zinc oxide being suitable for this purpose. Lithopone may be added to give color to the composition and any other coloring material may be added.

It will be understood that in place of zinc oxide any other suitable substance may be used such as carbon black or Stoughton earth. The proportion used will have to be varied, as will be understood in the art, according to the proportion of rubber or latex or other ingredients employed.

I prefer to use:

Zinc oxide_____ from about 6 to 25%
Lithopone_____ from about 3 to 18%

The composition described herein when applied on silk or cotton labels for example, will cause the labels to stick harder and last longer than has heretofore been possible. In addition the label will be impervious to water or steam.

In applying a label with my adhesive backing although a lesser heat will serve to affix the label the best results will be obtained if the label is exposed to a heat approximately equal to that of boiling water or greater.

In the following claims, I have defined my invention in terms of its solid constituents without the addition of any solvent. It will be readily understood in the art that a sufficient proportion of solvent may be used as required to reduce the solids.

What I claim is:

1. An adhesive composition comprising:

| | |
|---|---|
| Latex | from about 5 to 15% |
| Rubber | from about 20 to 52% |
| Resin | from about 3 to 10% |
| A filler | from about 6 to 25% |
| Gum | from about 6 to 25% |

2. An adhesive composition comprising:

| | |
|---|---|
| Latex | from about 5 to 15% |
| Rubber | from about 20 to 52% |
| Rosin | from about 1½ to 5% |
| Resin | from about 3 to 10% |
| A filler | from about 6 to 25% |
| Coloring matter | from about 3 to 18% |
| Gum | from about 6 to 25% |

3. An adhesive composition containing constituents in about the following proportions:

| | |
|---|---|
| Latex | from about 5 to 15% |
| Rubber | from about 20 to 52% |
| Rosin | from about 1½ to 5% |
| Copal | from about 3 to 10% |
| A filler | from about 6 to 25% |
| Coloring matter | from about 3 to 18% |
| Gum | from about 6 to 25% |

4. An adhesive composition containing constituents in about the following proportions:

| | |
|---|---|
| Latex | from about 5 to 15% |
| Rubber | from about 17 to 40% |
| Rosin | from about 1½ to 5% |
| Any tacky rubber | from about 3 to 12% |
| Soft copal | from about 3 to 10% |
| Zinc oxide | from about 6 to 25% |
| Lithopone | from about 3 to 18% |
| Gutta-percha | from about 6 to 25% |

In testimony whereof I affix my signature.

RALPH W. LANE.